United States Patent

Barclay

[11] Patent Number: 6,030,436
[45] Date of Patent: Feb. 29, 2000

[54] PERMEATION TUBE FOR DELIVERING FLUID AT A CONSTANT FLOW RATE INDEPENDENT OF AMBIENT TEMPERATURE VARIATIONS

[75] Inventor: L. Harvey Barclay, Houston, Tex.

[73] Assignee: Valco Instruments Company, Inc., Houston, Tex.

[21] Appl. No.: 09/152,440

[22] Filed: Sep. 14, 1998

[51] Int. Cl.[7] ............................................. B01D 53/22
[52] U.S. Cl. ............................ 95/45; 96/4; 96/9; 96/11
[58] Field of Search ........................ 95/45–54; 96/4, 96/6, 7, 9, 11; 261/21, 22, 104, 107

[56] References Cited

U.S. PATENT DOCUMENTS

| | | | |
|---|---|---|---|
| 3,471,692 | 10/1969 | Llewellyn et al. | 96/9 X |
| 3,760,831 | 9/1973 | Colvin | 137/117 |
| 3,763,877 | 10/1973 | Lieb | 137/117 |
| 4,208,902 | 6/1980 | Kim et al. | 96/9 X |
| 4,787,921 | 11/1988 | Shibata et al. | 96/6 |
| 4,790,857 | 12/1988 | Miksch | 96/11 X |
| 5,133,862 | 7/1992 | Cannan et al. | 96/4 X |
| 5,227,063 | 7/1993 | Langerak et al. | 96/6 X |
| 5,254,143 | 10/1993 | Anazawa et al. | 96/6 X |
| 5,348,691 | 9/1994 | McElroy et al. | 261/104 X |
| 5,411,720 | 5/1995 | Neuhaus | 95/45 X |
| 5,523,003 | 6/1996 | Sell et al. | 261/107 X |
| 5,538,536 | 7/1996 | Fuentes et al. | 95/45 |
| 5,563,330 | 10/1996 | Kimmig | 261/104 X |
| 5,611,842 | 3/1997 | Friesen et al. | 95/45 X |
| 5,738,808 | 4/1998 | Iwamoto | 261/104 |
| 5,849,089 | 12/1998 | Tsunashima et al. | 261/104 X |
| 5,890,703 | 4/1999 | Kaus et al. | 261/104 X |

FOREIGN PATENT DOCUMENTS

7904243  12/1979  Netherlands ........................ 96/11

*Primary Examiner*—Robert H. Spitzer
*Attorney, Agent, or Firm*—Gunn & Associates

[57] ABSTRACT

This disclosure features a permeation storage chamber in a tube having a first membrane delivering a permeate flow into an intermediate chamber. This chamber delivers flow from a second membrane. The intermediate chamber delivers surplus permeate out through a pressure regulator, or a drain tube. Pressure stabilization at the second membrane enables constant permeation discharge, avoiding pressure or temperature dependent flow rate charges.

37 Claims, 3 Drawing Sheets

PERMEATION TUBE FOR DELIVERING FLUID AT A CONSTANT FLOW RATE INDEPENDENT OF AMBIENT TEMPERATURE VARIATIONS

BACKGROUND OF THE INVENTION

1. Field of the Invention

This invention is directed toward apparatus and methods for delivering a flow of liquid at a constant, controllable flow rate over long periods of time, and more specifically toward a dual diaphragm permeation tube which provides a flow of gas at a controllable, constant volume flow rate over a wide range of ambient temperature variations for periods of one year or longer.

2. Background of the Art

Virtually all analytical measurement instrumentation requires initial and periodic calibration. Such instrumentation includes hydrocarbon "sniffers" which measure concentrations of hydrocarbons in fluids. This type of instrumentation also includes tracer systems with which small quantities of radioactive or non radioactive material are used to label or "tag" material of interest, and the concentrations of tagging material are subsequently measured to obtain the desired concentrations of tagged materials of interest. Gas chromatographs are routinely calibrated with gases of known concentrations at known, controllable flow rates. Other types and classes of analytical instrumentation requiring calibration using controlled flows of fluids, and especially controlled flows of gas, are well known to those skilled in the art of analytical measurements.

Permeation tubes containing a single permeable barrier have been used in the prior art to provide a flow of fluid for calibration and other purposes. These tubes are typically cylindrical with a solid wall from one end and an output at the opposite end. A permeable barrier is positioned within the tube in the solid cylinder and the output end. Fluid is stored in the tube at a predetermined initial pressure. By selecting the type and the dimension of the permeable barrier, fluid passing through the barrier and flowing from the output of the tube is thereby controlled. Stated another way, for a given storage pressure and at a given ambient temperature, the volume flow rate from the permeation tube is controlled by the type and geometry of the permeable barrier within the tube.

Materials used to form the permeable barrier depends upon the type or class of fluid for which flow is being controlled. Barrier materials may be elastomeric, although other materials may be used. Permeation tubes can be fabricated to control the flow of a wide range of chemicals including alcohol, ketones, acids, aldehydes, paraffins, liquefiable gases, aromatics, water, dimethyl sulfide and dimethyl disulfides.

As mentioned previously, many analytical instruments need to be calibrated with a calibration or "standard" fluid at a predetermined or "standard" flow rate. Since periodic calibration is usually required, it is important that a source of calibration gas provide flow at a controllable, constant volume flow rate over long periods of time such as one year or more. Ambient temperature of the calibration gas source can vary significantly over such long periods of time. Ambient temperature changes adversely affect the flow rate from prior art single barrier permeation tubes. Variations in ambient temperature induce changes in temperature of stored fluid within the solid cylindrical wall device and behind it the permeable barrier. If it is assumed that fluid is initially stored in the permeation tube at a constant pressure, ambient temperature changes therefore induce pressure changes in the fluid captured in the tube shell or housing and the barrier. These pressure changes, in turn, cause variations in volume flow rate through the barrier and through the tube output since the barrier is "passive". The required constant volume flow rate output for instrument calibration is, therefore, not provided by a single barrier permeation tube when the tube is exposed to varying ambient temperature.

In view of the above discussion of the prior art, an object of the present invention is to provide a permeation tube which provides a controllable output flow of fluid which is independent of variations in the ambient temperature of the tube.

Another object of the invention is to provide a permeation tube which provides a constant, controllable flow of output gas over long periods of time such as one year or longer.

Yet another object of the present invention is to provide a permeation tube which can provide controlled volume flow rate, independent of changes of ambient temperature, over a range of volume flow rates which are not obtainable with a single barrier device.

Another object of the invention is to provide a permeation tube which is rugged, relatively inexpensive to manufacture, initially fill and later refill, and suited for adverse field applications.

Still another object of the present invention is to provide a permeation tube which can easily be refilled with standard or "calibration" fluid to extend tube life.

There are other objects and applications of the present invention which will become apparent in the following disclosure.

SUMMARY OF THE INVENTION

This disclosure sets forth a dual barrier permeation tube which meets the above stated objects. The body of the tube is a hollow conduit, preferably cylindrical, and fabricated from metal such as stainless steel for dependability and ruggedness under field conditions. The body has an input at one end through which fluid is supplied, and an output from which fluid flows at a controlled rate independent of changes in ambient temperature.

Input fluid, preferably liquid, flows through a pressure regulator at the input and into the hollow cylindrical body where it engages a first permeable barrier within the tube body. The first permeable barrier allows flow through there at a first flow rate. There is a significant pressure drop in the fluid as it passes through the first permeable barrier. As a result of this pressure drop, the fluid emerges as a gas and continues to flow through the tube body and encounters a second permeable barrier. The second permeable barrier is designed so that the flow rate through this barrier is less than the flow rate through the first permeable barrier. Stated another way, the permeability of the second barrier is less than the permeability of the first barrier. The pressure of the gas between the first and second permeable barriers is, therefore, less than the sample liquid input pressure, but greater than the pressure of gas flowing through the second permeable barrier and out through the second barrier of the permeation tube.

A port, referred to as a "bleed" port, is located in the tube body between the first permeable barrier and the second permeable barrier. Output of gas through the bleed port is controlled by a bleed port pressure regulator valve. Since the ambient temperature varies and thereby varies pressure of the gas between the first and second permeable barriers, excess permeate flows through the bleed hole pressure regulator and to the atmosphere. This arrangement assures that the second permeable barrier receives 100 percent permeate at a constant ambient pressure determined by the setting of the bleed port regulator valve, and flow through the second barrier is at a constant volume flow rate. Changes in ambient temperature do not, therefore affect the output volume flow rate as is the case in prior art single barrier permeation tube devices.

Materials used to form the permeable barrier depends upon the type or class of fluid for which flow is being controlled. Permeation barrier material may be elastomeric, thermoplastic, thermoset, and mineral. The type of barrier material used for a given chemical is chosen because of its stability, permeable nature, and sensitivity to changes in temperature.

Dual barrier permeation tubes can be fabricated to control the flow of a wide range of chemicals provided that the chemicals are readily liquefied prior to input into the tube. Liquefiable gases include, but are not limited to, carbonyl sulfide, methyl mercaptan, ethyl mercaptan, hydrogen sulfide, carbon dioxide, sulfur dioxide and chlorine. Some pure materials can be compressed gas which does not liquefy; in that event, the storage chamber is gas filled or at a high pressure.

Flow output is determined by the physical and chemical structure of the permeable barriers, the input pressure, and the bleed hole pressure regulator valve setting. The dynamic range of the output flow can be increased significantly by changing the second permeable barrier using a turret arrangement comprising a plurality of interchangeable permeable barriers, or by reducing barrier area.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
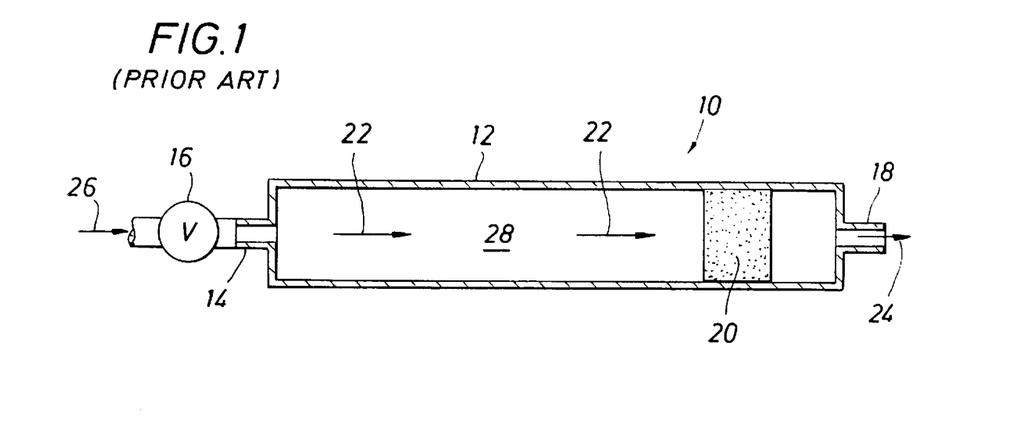
FIG. 1 shows a sectional view of a typical prior art permeation tube containing a single permeable barrier.

A typical permeation tube containing a single permeable barrier is shown in sectional view in FIG. 1, and is identified as a whole by the numeral 10. The tube 10 consists of a hollow, cylindrical body 12 terminated with an input fitting 14 at one end and an output fitting 18 at the opposite end. A permeable barrier 20 is positioned within the tube body 12 between the input fitting 14 and the output fitting 18. Flowing fluid, represented conceptually by a flow arrow 26, is input typically through a regulating valve 16 temporarily attached to the input fitting 14 and into the tube at the input at a predetermined input pressure, as represented by flow arrows 22. By selecting the type and the dimension of the permeable barrier 20, fluid passing through the barrier and flowing, as represented by flow arrow 24, through the output fitting 18 is thereby controlled. Ambient temperature changes $\Delta T$ adversely affect the volume flow rate (conceptually represented by the flow arrow 24) leaving the tube 10. Variations $\Delta T$ in ambient temperature T induce changes in temperature of fluid within a region 28 between the input fitting 14 and the barrier 20. The tubes are often charged and used in the field for months or years. If it is assumed that the initial fluid pressure remains constant, ambient temperature changes therefore induce pressure changes $\Delta P$ in the fluid residing in the region 28. These pressure changes, in turn, cause variations in volume flow rate through the barrier 20 and out through the tube output since the barrier is "passive".

Figure 2:
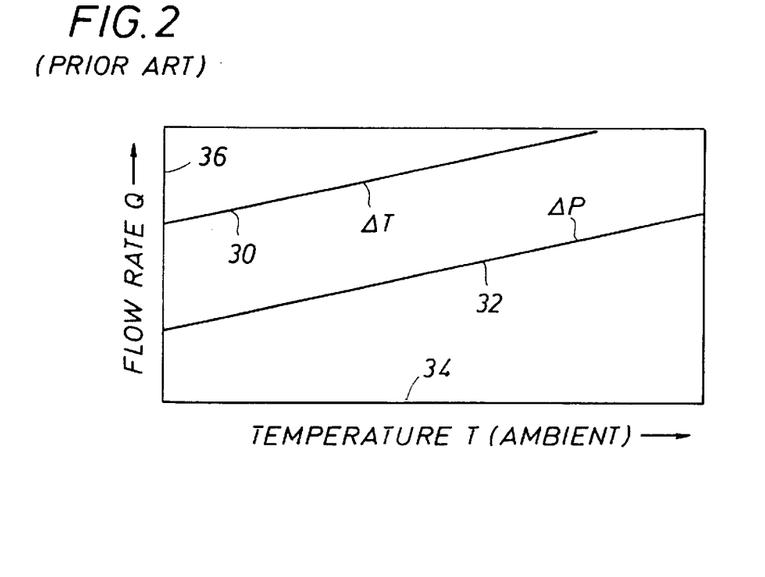
FIG. 2 illustrates output flow rate Q plotted as a function of ambient temperature T for the prior art permeation tube.

As illustrated graphically in FIG. 2, the desired constant volume flow rate output Q is not provided by the single barrier permeation tube 10 when the tube is exposed to varying ambient temperature. FIG. 2 illustrates output flow rate Q plotted on the ordinate 36 as a function of ambient temperature T plotted on the abscissa 34. As ambient temperature T increases, the change in temperature $\Delta T$ within the region 28 of the tube increases as illustrated by curve 30. The increase in ambient temperature $\Delta T$ causes the differential pressure $\Delta P$ induced across the barrier 20 illustrated by curve 32, to increase. This, in turn causes an increase in the flow rate Q through the single permeation tube 10.

Figure 3:
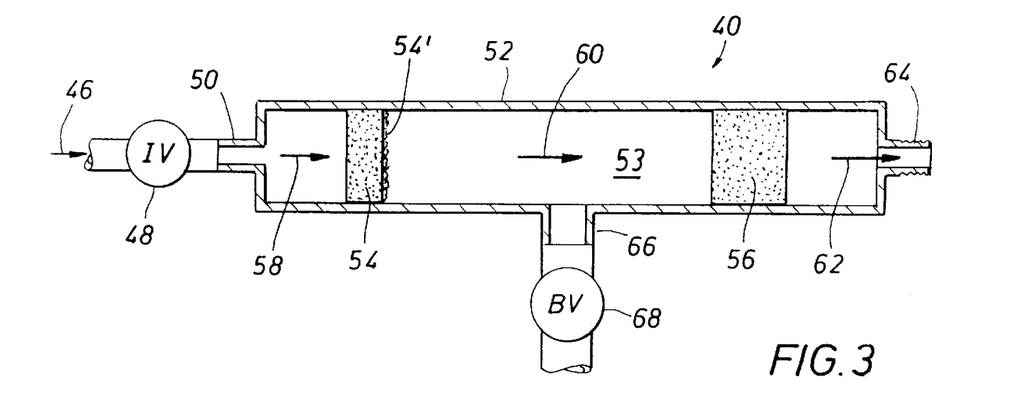
FIG. 3 is a sectional view of a dual barrier permeation tube.

A sectional view of a dual barrier permeation tube is shown in FIG. 3 and is identified as a whole by the numeral 40. The body 52 of the tube is a hollow and preferably cylindrical conduit fabricated from metal such as stainless steel for dependability, durability and robustness under field conditions. The body is usually a cylinder and is inert or non reactive for the stored sample material. Dimensions of the tube body can be varied, but the length typically is between 2.0 and 6.0 inches and the diameter is typically between 0.5 and 1.0 inches. The body 52 is terminated at one end with an input fitting 50 through which a fresh supply of liquid or compressed sample is supplied, and at the opposing end with an output fitting 64 from which gas flows from the tube 40 at a controlled rate independent of changes in ambient temperature. The output fitting 64 is preferably a threaded male fitting so that the tube 40 can be easily engaged with another apparatus such as a manifold connected to a measuring or metering device. The threaded male output fitting 64 can also be used as a means for disabling the tube 40 by applying a cap with suitable female threads.

Still referring to FIG. 3, fresh or pure liquid input fluid flows through a pressure regulator 48, as indicated conceptually by the flow arrow 46, and through the input fitting 50 and then into the hollow tube body 52, as indicated conceptually by the flow arrow 58, where it engages a first permeable barrier 54 bridging the inner wall of the tube body. The first permeable barrier 54 allows flow through there at a first flow rate $Q_1$. There is a significant pressure drop in the fluid as it passes through the first permeable barrier 54. As a result of this pressure drop, the stored or compressed gas or liquid emerges from the first permeable barrier as a gas, and continues to flow through an intermediate chamber 53 defined by the tube body 52, as indicated conceptually by the flow arrow 60, and subsequently encounters a second permeable barrier 56. The permeability of the second barrier 56 is less than the permeability of first barrier. The flow rate $Q_2$ through the second barrier, as an example the first permeable barrier 54 shown in FIG. 3, is less, therefore, less than the flow rate $Q_1$ through the first permeable barrier. It should be understood that these flow rate differentials can be implemented by varying the physical dimensions of the barriers, the permeability of material from which the barriers are fabricated, or by using a combination of both techniques. As an example, if the permeable barriers 54 and 56 are fabricated with material of identical permeability properties, then the net permeability of the second barrier 56 can be reduced by 50% by doubling the thickness of the second barrier in the dimension parallel to the flow. FIG. 3 illustrates a second barrier 56 which is twice as thick as the first barrier 54. The pressure P of the gas between the first and second permeable barriers is, therefore, less than the liquid input pressure but greater than the pressure of gas flowing through the second permeable barrier 56 and out through the output fitting 64.

Again referring to FIG. 3, a port 66, referred to as a "bleed" port, is located in the tube body 52 between the first permeable barrier 54 and the second permeable barrier 56. Output of gas through the bleed port 66 is controlled by a bleed port pressure regulator valve 68. If the ambient temperature varies and thereby varies pressure of the gas between the first and second permeable barriers, excess permeate flows through the bleed port 66 and the cooperating pressure regulator valve 68, and then to the atmosphere. For environmental purposes, it is preferred to contain or trap excess permeate flowing from the bleed port pressure regulator 68 in a water trap, charcoal filter, or the like (not shown). The bleed port 66 and cooperating pressure regulator valve 68 assure that the second permeable barrier 56 receives 100 percent permeate at a constant ambient pressure, and flow from left to right through the second barrier 56 is at a constant volume flow rate Q.

The pressure regulator can be replaced with simpler pressure regulation equipment. Also, most pressure regulators work in a flowing system, or with a relatively large pressure offset. In this instance, very acceptable performance is obtained by alternate mechanisms. In place of the regulators, a drain line of relatively small diameter having a length of a few inches will suffice. Since most permeation tubes are used in sniffer devices, care must be exercised to avoid venting to the atmosphere. Indeed, any discharge to the surrounding area must be diverted away from the area so that the sensitive measuring device does not get a bias from detection of the discharged gas.

A simple discharge line of small size is a good replacement for the pressure regulator. The line can be crimped to slightly restrict flow. The crimp need not close the line totally but it does limit the discharge rate. Since there is some small positive pressure from the space between permeable members, flow to the exterior is common and reverse flow is prevented. The space between the two permeable members is significantly pressure stabilized. Another form of pressure regulation is obtained from a simple, small diameter hole in the intermediate chamber. As before, the discharge must be directed away from the sniffer.

Figure 4:
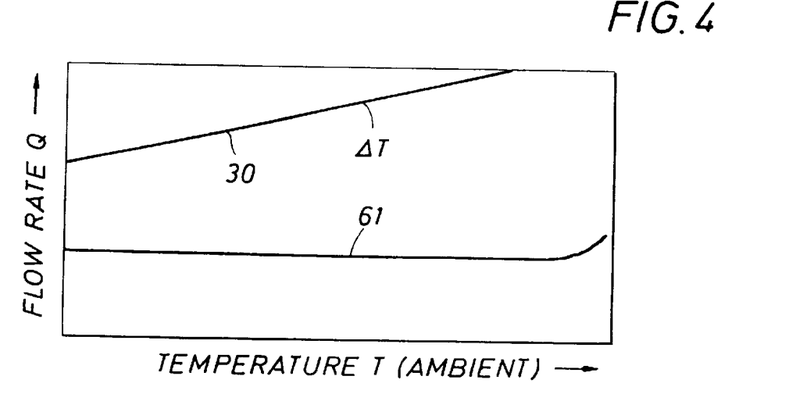
FIG. 4 is a plot of output flow rate Q as a function of ambient temperature T for the prior art and dual barrier permeation tubes.

Changes $\Delta T$ in ambient temperature do not, therefore affect the output volume flow rate Q from the permeation tube 40 as is the case in single barrier device 10. FIG. 4 illustrates flow rate Q from both the single barrier permeation tube 10 (see FIG. 1) and the dual barrier tube presented in this disclosure. Flow rate Q is plotted as a function of ambient temperature T. Curve 30 shows the change in volume flow rate Q as a function of temperature T for the single barrier tube 10. This curve is also shown on the graph of FIG. 2. As discussed previously, Q increases as ambient temperature increases thereby illustrating the unwanted ambient temperature dependence of the single barrier permeation tube 10. Curve 61 illustrates the volume flow rate Q output from the dual barrier tube 40 as a function of ambient temperature T. It is apparent that Q is independent of T over ambient temperature variations of typically 125 to 150 degrees Fahrenheit (°F.). At the upper limit of the temperature axis, the curve 61 shows some increase in flow rate Q signifying the upper limit of the range of flow control of the tube 40.

As mentioned previously, the materials used to form the permeable barrier depends upon the type or class of fluid for which flow is being controlled. Permeable barrier material may be elastomeric, thermoplastic, thermoset, and mineral. The type of barrier material used for a given chemical is chosen because of its stability, permeable nature, and sensitivity to changes in temperature.

Dual barrier permeation tubes can be fabricated to control the flow of a wide range of chemicals provided that the chemicals are readily liquefied or compressed in gas form prior to input into the tube 40 through the regulator valve 48 and input fitting 50 (see FIG. 3). Controllable liquefiable gases include, but are not limited to, carbonyl sulfide, methyl mercaptan, ethyl mercaptan, hydrogen sulfide, carbon dioxide, sulfur dioxide and chlorine. It should also be noted that the tube 40 can be refilled with input fluid through the input fitting 50 shown in FIG. 3. Alternately, the tube can be refilled with a dedicated refill port (not shown) in the tube body 52 between the inlet fitting 50 and the first barrier 54. Detachment commonly occurs so the tube can be used in the field for many months.

Flow output is determined by the physical and chemical structure of the permeable barriers, the pressure of the captured chemical, and the bleed hole pressure regulator setting. Conditions for constant output flow from the tube 40 is that the flow rate $Q_1$ through the first barrier 54 is always greater than the flow rate $Q_2$ through the second barrier 56. The dynamic range of the output flow rate Q can, however, be increased significantly by varying the permeability of the second barrier 56 as long as $Q_1 > Q_2$. It is, however, more practical to configure the apparatus so that a plurality of barriers with different permeability's can be easily inserted in the position occupied by the second barrier 56. The preferred means for providing interchangeable second barriers is a turret arrangement illustrated in FIGS. 5a and 5b. It should be understood, however, that other techniques such as a slide with multiple barriers (not shown) can also be effectively employed.

Figure 5A:
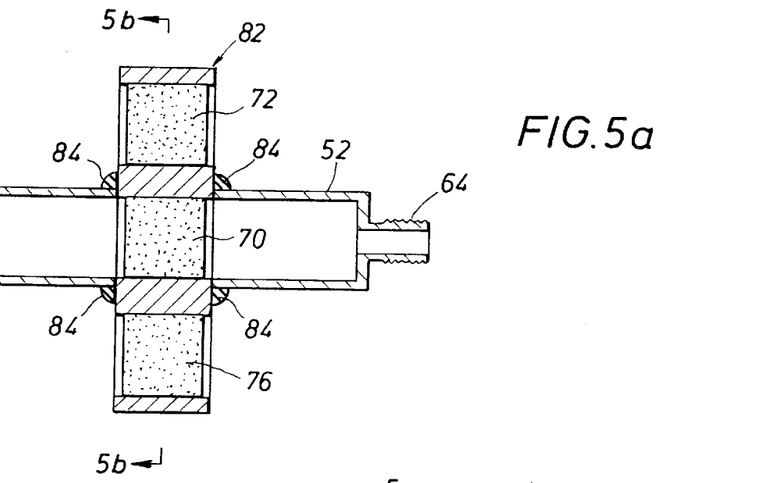
FIG. 5a is a side sectional view of a dual barrier permeation tube which uses a plurality of interchangeable "second" barriers.
Figure 5B:
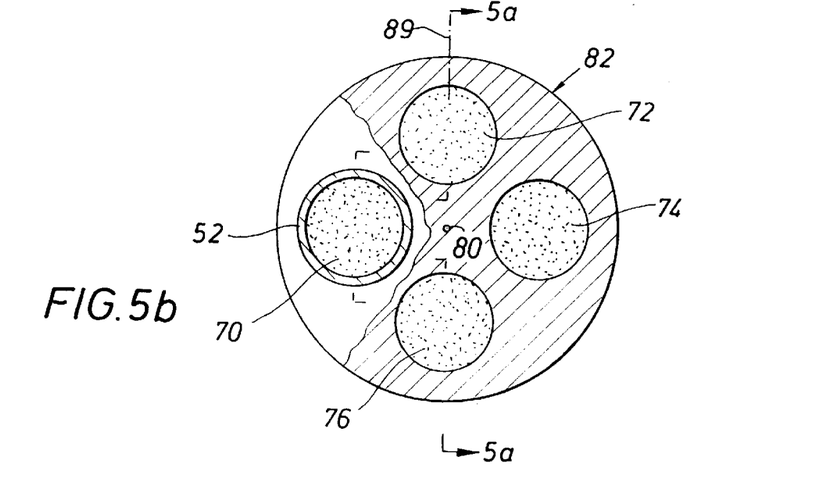
FIG. 5b is a front sectional view of a dual barrier permeation tube which uses a plurality of interchangeable "second" barriers.
Figure 6:
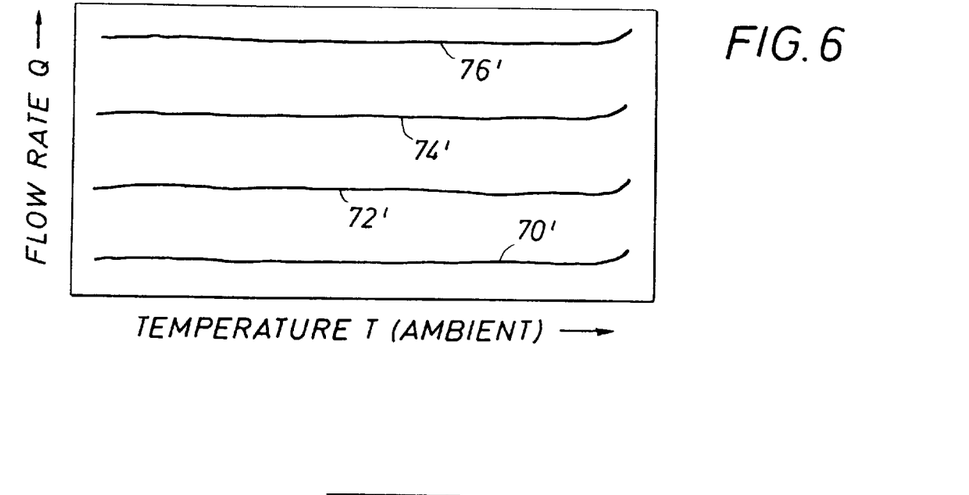
FIG. 6 is a plot of output flow rate Q as a function of ambient temperature T for a dual barrier permeation tube configured to employ four different "second" permeable barriers.

Attention is directed to both FIGS. 5a and 5b. FIGS. 5a and 5b show a side sectional view and a front sectional view of turret arrangement along a reference line A-A'. A turret 82 contains four permeable barriers 70, 72, 74 and 76 with permeability's yielding volume flow through rates $Q_{2,1}$, $Q_{2,2}$, $Q_{2,3}$ and $Q_{2,4}$, respectively. Using previously defined convention, the first subscript "2" identifies these barriers as "second" permeability barriers, and the second subscript 1, . . . ,4 identifies individual barriers 70, 72, 74, and 76, respectively, mounted within the turret 82. FIGS. 5a and 5b show the turret 82 positioned with respect to the tube body 52 so that barrier 70 is serving as the second permeability barrier. The turret 82 can be rotated either clockwise or counter clockwise about a bearing point 80 such that barriers 72, 74, or 76 can likewise be positioned within the tube body 52 and serve as the second permeable barrier for the permeation tube 40. Sealing means 84 maintain pressures on each side of the barrier positioned within the tube body 52. Assume for purposes of discussion that the permeability of barrier 70 is less than the permeability of barrier 72, which is less than the permeability of barrier 74, which is less than the permeability of barrier 76. Furthermore, to meet criteria required for constant flow, the permeability and flow rate $Q_1$ of the first barrier 54 is greater than the permeability of all possible "second" barriers. Using this example, $Q_{2,1} < Q_{2,2} < Q_{2,3} < Q_{2,4} < Q_1$. The flow rates Q through the tube 40 using barriers 70, 72, 74 and 76 are represented by the curves 70', 72', 74' and 76', respectively, in the plot of Q versus T shown in FIG. 6. Flow through the permeation tube 40 increases as the barriers 70, 72, 74 and 76 are sequentially inserted into the flow path within the tube body 52. It should be noted, however, that for each second barrier selected, the flow Q is independent of changes in ambient temperature T except at the upper temperature limits which exceed the operational control limits of the device 40.

The apparatus shown in FIGS. 5a and 5d employs four barriers which are used as "second" permeable barriers in the permeation tube 40. It should be understood that any number n of changeable barriers can be used in the embodiment of the invention using plural "second" barriers, where n is an integer greater than 2.

Volume flow rate outputs from the dual barrier permeation tube can be varied over a wide range by selecting and changing components of the apparatus as previously discussed. The apparatus can be configured to yield flows ranging typically from 1 to 300,000 nanograms per minute, for time periods of one year or more. Insensitivity to changes in ambient temperature is also maintained over a wide range of ambient temperatures of 125 to 150° F.

Membrane Construction and Benefits of the Disclosed Construction

It is not uncommon to make a single membrane permeation tube with a relatively thick and stiff membrane. Consider common membranes which are made with a permeable fluorocarbon material (TEFLON™ is a good example of that). The single diaphragm permeation tube is normally required to hold substantial pressure on the back side of the permeable membrane. This may require the construction of a permeable membrane which is relatively thick. When it is made and shipped with a cap on it, the cap prevents the initial flow. Removal of the cap will then expose the membrane so that flow can began. The thickness required for such a construction is so great that it takes typically several hours, perhaps even one or two days, for the flow rate to stabilize. In part, this is a result of the extra thick construction mandated to resist relatively high internal pressures.

The device of the present disclosure has the advantage of using a much thinner membrane, as an example the first permeable barrier 54 shown in FIG. 3. The first permeable membrane is preferably made of a reasonably thin material which is also selected to be inert to the high pressure gas or liquid reservoir on the back side of it. Such thin membranes can be made by forming a relatively thin layer 54' which forms a webbing in a small piece of woven screen mesh. The mesh serves as a structural reinforcement, and the thin membrane provides the permeation barrier for the first permeable member.

The second permeable member is not exposed to great differential pressures. The differential pressure across the second membrane is really quite small so that structural integrity is achieved with relatively thin material. Continuing, the second membrane is made relatively thin so that the time to stabilize flow through it is substantially nil. When it is closed or sealed in a container for shipping or storage, and the cap is removed which it then exposes the second membrane, the flow through it will stabilize rather quickly. In effect, it goes to full flow in just a few seconds. The full flow rate achieved by the second membrane is achieved quickly without a long cycle where the flow rate ramps from no flow to some desired calibration flow rate.

Flow from this double membrane system enables the second membrane to therefore deliver the mandated flow rate quickly. Flow from that membrane is relatively quickly achieved so that the permeation tube device can be used in calibration circumstances quickly. The aggregate time delay flowing through the first and second membranes is therefore much less than the cumulative delay through a large relatively thick, high pressure membrane installed in typical permeation tubes.

The material chosen for the two membranes can be the same or can be different. The first membrane is normally required to be significantly strong (either alone or boosted by reinforcing mesh), and the second membrane is normally more flexible because it is exposed to a smaller pressure differential. Structurally the second membrane normally does not need a reinforcing mesh.

The material of the two membranes in part is determined by the strength requirements. Again referring to FIG. 3, the first membrane 54 therefore is typically a thin membrane which is highly permeable and is backed by the reinforcing mesh. The second is normally unsupported, i.e., it does not need the mesh 54'. The materials commonly are similar; in some situations, they can be different materials.

Membrane Material Construction

As noted in this disclosure, the membrane is a permeable member. On one side, it is exposed to a liquid which vaporized to a gas under pressure. Consider first the use of an odorant which is gaseous form. The gas is compressed to some elevated pressure on one side of the membrane. Gas molecules migrate through the membrane. A number of factors impact the rate of permeation. Effectively, the gas impinges on the exposed face of the membrane and ultimately enters the material of the membrane. Effectively, gas is dissolving into the substance making up the membrane. With a surplus of molecules on that face, the individual molecules migrate through the membrane. The migration rate depends on a number of scale factors. Rather than focus on the migration rate of a single molecule, it is better to consider the aggregate flow of gas molecules, namely the net output of the gas after it has stabilized from an initial condition. Generally speaking, the migration rate of the gas through the membrane depends on the exposed facial area of the membrane. The membrane is thicker, the flow rate is slower. However, this flow rate can again stabilize so that the flow rate through a relatively thin or relatively thick membrane will ultimately be about the same. In other words, the membrane becomes saturated with the migratory gas molecules. At bottom, the gas flow rate is dependent typically on the vapor pressure of the liquefied fluid in the container, or is dependent on the pressure differential across the membrane.

Perhaps the most important factors involved in the permeation rate through the membrane are the chemistry of the membrane itself as well as the reaction of the membrane with the permeation gas. Consider as an example a permeation tube that stores hydrogen at high pressure. Hydrogen is the smallest molecule available so the small size of the molecule would normally suggest a relatively quick transit time and relatively high flow rate of hydrogen through the membrane. In fact, that is not the situation. Hydrogen is chemically reactive and will in some fashion react in the membrane material and the flow rate will actually be significantly less. Accordingly, the relative reactivity between the material making up the membrane and the gas passing through it is a significant factor. As between any selected two materials, if they are not reactive with each other and if the molecule is relatively small, and if the pore spaces in the solid material making up the membrane are relatively open, then the gas will flow through it with greater ease. Again, there are a number of factors that impact this as is noted and it is believed that the chemical activity (or relative inactivity) between the odorant and the membrane are significant factors. These are somewhat impacted by pressure against the membrane, relative temperature of the membrane, relative temperature of the gas and so on. Suffice it to say, these factors enter into an evaluation of reactions occurring in the membrane and connected with the migration rate of the gas molecules. The foregoing is true both for a gas or a liquid which will gasify. Typical materials used in membrane construction include neoprene, viton, polyethylene, polyurethane, fluorcarbons (one example is TEFLON FEP, a particular model of TEFLON), C-flex, various silicones including silicone RTV and so on.

Continuous Duty Sample Permeation

Figure 7:
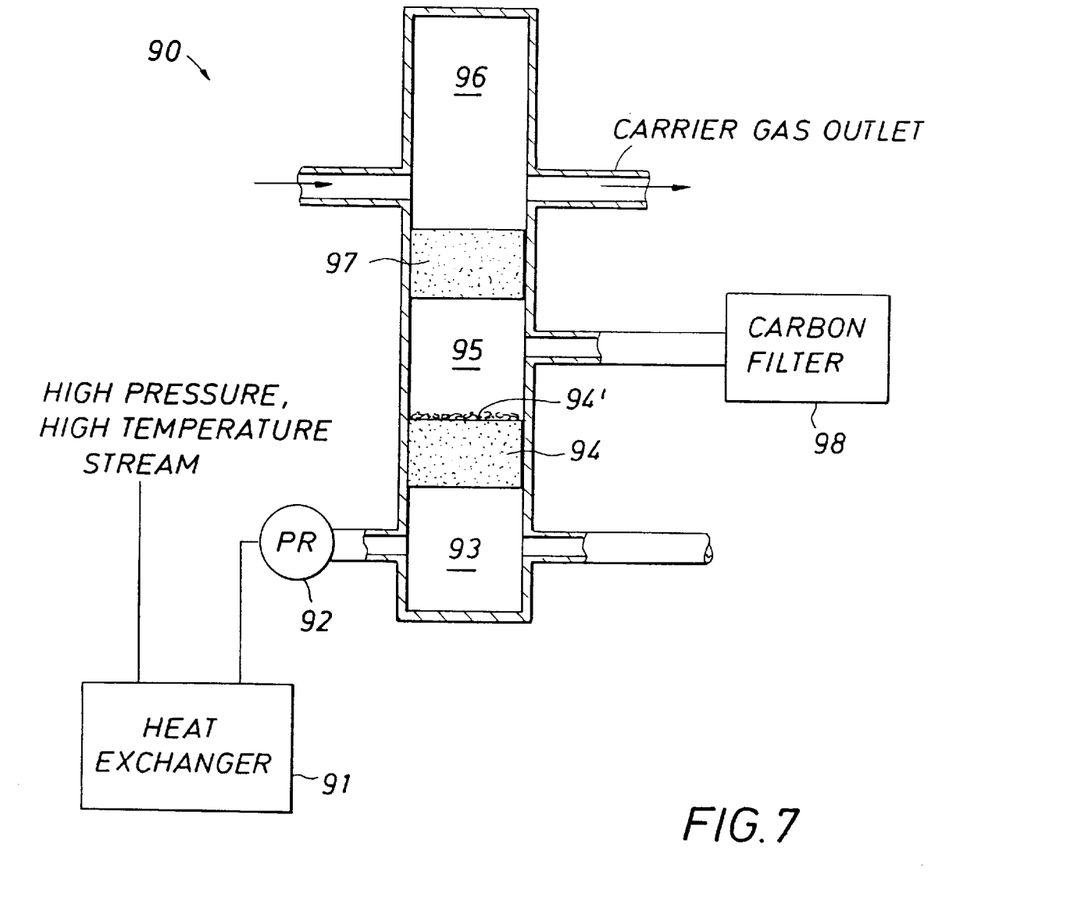
FIG. 7 shows an embodiment of the invention in which high pressure high temperature input is first delivered to a heat exchanger and pressure regulator system.

In FIG. 7 of the drawings, the embodiment 90 shows another version of the equipment. In this particular instance, a high pressure high temperature stream is delivered to an optional heat exchanger 91 and then is output by it through a pressure regulator 92. That flow is input to a chamber 93 which is closed by the first membrane 94. Permeation gas is delivered into the mid chamber 95. The mid chamber 95 then delivers permeation product into the top chamber 96 through the membrane 97. The chambers 93, 95 and 96 operate in the same fashion as set forth above. In other words, the material which will permeate through the first membrane is delivered into the chamber 93. There is a discharge or flow into mid chamber 95. The last or top chamber 96 receives permeation gas flowing through the second membrane. This equipment is identical in that first and second membranes are involved.

The feed for this equipment which is typically involved in dilution of a process plant output may be delivered at high pressure and high temperature. To the extent this is involved, the flow is delivered to the equipment at some selected source of determined high pressure and high temperature. It can be only high pressure or high temperature but it can also be both. It is not uncommon for manufacturing plants to continuous operate around the clock and deliver an output stream which is at high pressure, high temperature, some may be even as high as 1000° F. and 1000 psi. In the petrochemical industry, distillation columns and furnaces often discharge output streams at that level. That stream can be selected and delivered to the present equipment. As appropriate, it is delivered through a small line which is input to the heat exchanger 91. That may optionally be necessary to drop the ambient temperature to a temperature which can be used for this equipment. Also, the system includes a pressure regulator 92. This assures that the pressure delivered is not so great that the equipment may be damaged. As a practical matter, the high pressure high temperature fluid sometimes can be delivered into the chamber 93 without dropping either temperature or pressure. The chamber 93 is provided with the stream to be sampled. As before, this can be maintained at some nominal pressure or even some high pressure. The pressure regulator 92 is incorporated for the purpose of providing a margin of protection so that the diaphragm 94 is not over stressed. As before, it can be provided with a back up structural screen 94'for integrity. In any event, the diaphragm 94 is made structurally adequate for the operating additions encountered. The sampled fluid is delivered into the chamber 93 and flows out of the chamber. This flow rate can be relatively small. The sampling rate might be a few cubic centimeters per minute in a small line from a plant producing thousands of gallons per hour. Whatever the scale factor, the stream is delivered into the chamber 93.

With the chamber 93 filled with the sample of interest, permeation through the membrane 94 occurs. The chamber 95 is provided with the gas flow. The chamber 95 is filled with the discharged gas through the permeation membrane 94. Excess pressure in the chamber however is again controlled by incorporation of an outlet line with a dimple bent in it to provide a modest orifice or restriction so that back flow does not occur. Effectively, this is used to moderate pressure in the chamber 95. Effectively, that chamber is at atmospheric pressure. The membrane 97 serves as the second membrane. It delivers the permeate gas into the chamber 96 at a constant flow rate. The chamber 96 however is swept steadily by a carrier gas inlet and outlet flow. Flow moves from the left to the right in FIG. 7. The carrier gas is relied on to deliver the permeate gas in a selected ratio. Consider as an example a typical situation where the plant process produces a specified volume of material around the clock. A sample is taken continuously. It is sometimes difficult to get a good sample or meaningful sample from a process stream which is at 1000° F. and 1000 psi. This system enables such a small sample to be obtained. The liquid or gas, as the case may be, is input through the chamber 93. It provides a permeation gas discharge ultimately directed through the chamber 95 into the chamber 96. The first membrane 94 provides an excess of permeate gas thereabove while the second membrane 97 provides delivery into the carrier gas. Since the gas flow is in the direction of the arrows illustrated, the gas flow sweeps the chamber 96 and delivers the sample of the permeate out for disposition. The entire system will operate around the clock by providing the requisite ratio of the appropriate gaseous sample from the manufacturing process and output it to an appropriate analyzer. The carrier gas flow system can then be input to a GC for testing. The imposition of the first and second membranes between the sample and the carrier gas system assures that proper sample segregation is done.

The present embodiment in FIG. 7 is used to advantage with a continuous system. The membrane 97 can be a fixed membrane or it can be switched out as part of the turret mechanism previously shown in FIGS. 5a and 5b. Moreover this mechanism assures proper delivery of the permeate gas independent of pressure regulation upstream of the membrane. This especially helps size the gas flow rate to the desired rate per minute.

Bleed Hole Design and Location

Sometimes, the bleed hole from between the two membranes will discharge a gas flow of surplus odorant which is benign in the circumstances. Examples are $CO_2$, water and so on. Others are relatively benign in the small quantities which are pertinent to this kind of equipment. There are, however, some vaporized fluids which are simply not readily discharged to atmosphere. Others can be discharged to the atmosphere provided the quantities are relatively small. While in theory, methane is flammable and can even be explosive in accumulated areas, the amount of methane involved in this equipment and the amount actually discharged from between the two membranes is so small that it is significantly less than methane emissions from decaying livestock droppings. In the present system, it is preferable that the bleed hole between the two membranes have a relatively small diameter. A diameter of 1/32 inch or smaller is typically suitable. Generally, it is not desirable to have a bleed hole greater than about 1/16 inch. Again, this can be a hole or a longer tube with a crimped tube region.

Typically, the bleed hole can be vented to atmosphere where the discharge gas is neutral or benign in the volumes implicated by the equipment. In some instances, the discharge may be an irritant, have an odor or can be actually corrosive or dangerous for other reasons. It is possible to direct the discharge line shown in FIG. 7 to atmosphere. Alternately, the line from the chamber 95 can be directed to a charcoal filled scrubber. This can readily have the form of a simple cylinder 98 which is filled with granulated charcoal (a form of carbon). That absorbs the reactant discharged through the line.

A number of scale factors will materially assist in controlling the flow of the surplus permeation gas. Assuming a highly corrosive or significantly noxious gas, the impact of it can either be slowed or eliminated simply by directing it out through a longer line which permits installation under a protective hood or other disposal device. While it is possible to use a small bleed hole which discharges to atmosphere, the bleed hole can be located at the end of the line exemplified in FIG. 7, and that line can have any suitable length. The length can be extended provided it does not serve as a restricted orifice. A line of several inches or several feet can deliver the surplus and unwanted permeate gas to a hood, a flare, to a chimney or other location where it is less significant. Again, it should be kept in mind that this discharge to atmosphere can be filtered if desired, but if unfiltered, the flow volume is trivial, so much so that regulatory authorities generally are not concerned with that level of discharge.

The above specification discloses the present invention in preferred embodiments. It will be appreciated by those skilled in the art that there are yet other modifications that could be made to the disclosed invention without deviating from its spirit and scope of the invention as so claimed.

What is claimed is:

1. A method of providing a controlled rate of flow from a supply of stored chemical to enable provision of a controlled flow rate of a permeable gas comprising the steps of:
   (a) storing the supply of stored chemical in a closed storage chamber;
   (b) delivering the stored chemical supply from the storage chamber through a first permeable membrane providing permeate therethrough at a first rate;
   (c) directing the flowing permeate delivered at a first rate to a second permeable membrane and therethrough at a second rate which is less than the first rate; and
   (d) regulating the pressure of the permeate between the first and second permeable membranes.

2. The method of claim 1 including the step of periodically filling the storage chamber with the supply of stored chemical.

3. The method of claim 2 including the step of constantly draining permeate between said first and second permeable membranes so that pressure is stabilized at the second membrane.

4. The method of claim 3 wherein the permeate flow rate through the first membrane is greater than the flow rate through the second membrane, and excess permeate is removed so the second membrane is a sole permeate source.

5. The method of claim 3 wherein the step of pressure regulation is performed by bleeding permeate from an intermediate chamber between said first and second permeable membranes at a controlled rate so that there is no pressure build up in that chamber.

6. The method of claim 5 wherein said permeate from said intermediate chamber is bled through a port in said intermediate chamber and then through a pressure regulator means.

7. The method of claim 6 wherein said pressure regulator means comprises a pressure regulator valve.

8. The method of claim 6 wherein said pressure regulator means comprises a sized drain line.

9. The method of claim 6 wherein said pressure regulator means comprises a flow tube with a crimp therein.

10. The method of claim 1 further including the step of delivering the stored chemical supply between said first permeable membrane and said second permeable membrane in a permeate flow space therebetween maintained at a fixed pressure.

11. A permeation tube comprising:
    (a) a closed storage chamber containing a stored chemical supply;
    (b) a first permeable membrane exposed to said stored chemical supply;
    (c) an intermediate chamber located to receive intermediate chamber permeate from said first permeable membrane;
    (d) a second permeable membrane exposed to said intermediate chamber provided with said intermediate chamber permeate to enable said intermediate chamber permeate to flow through said second membrane; and
    (e) a pressure control mechanism regulating pressure in said intermediate chamber.

12. The apparatus of claim 11 wherein said first and second permeable membranes are formed of the same material to enable said stored chemical supply to permeate through said first and then said second permeable membranes.

13. The apparatus of claim 12 wherein a ratio of permeability of said first permeable membrane to permeability of said second permeable membrane is inversely proportional to a ratio of a thickness of said first permeable membrane to a thickness of said second permeable membrane.

14. The apparatus of claim 11 wherein said storage chamber is a tube formed of nonreactive metal, and including an inlet to said storage chamber for periodic filling of said chamber with the stored chemical supply.

15. The apparatus of claim 14 wherein said tube comprises an elongate solid housing terminating in a transverse circular opening and said first permeable membrane is located in said opening to serve as the sole and exclusive outlet from said storage chamber.

16. The apparatus of claim 15 wherein said first and second permeable membranes are spaced apart to define said intermediate chamber, and said pressure control mechanism is connected between said first and second permeable membranes.

17. The apparatus of claim 16 wherein said second permeable membrane is mounted in a turret to enable said second permeable membrane to be exchanged for an alternate second permeable member of different permeability.

18. The apparatus of claim 17 wherein said pressure control mechanism comprises a pressure regulator.

19. The apparatus of claim 18 wherein said intermediate chamber comprises a port.

20. The apparatus of claim 19 wherein said pressure regulator is connected to said port.

21. The apparatus of claim 17 wherein said pressure control mechanism comprises an elongate drain tube discharging permeate to atmosphere to stabilize the pressure in said intermediate chamber.

22. The apparatus of claim 11 including an inlet control valve for releasable connection with said closed storage chamber to fill the chamber with the stored chemical supply.

23. The apparatus of claim 11 wherein said closed storage chamber and said intermediate chamber are serially located in an elongate tube, and terminates in a threaded fitting surrounding said second permeable membrane to enable a cap to be placed on said fitting to prevent flow from said second permeable membrane.

24. The apparatus of claim 11 wherein said second permeable membrane is mounted in a turret to enable said second permeable membrane to be exchanged for an alternate second permeable member of different permeability.

25. The apparatus of claim 11 wherein said permeation tube comprises an elongate cylindrical construction supporting said first and second permeable membranes parallel and spaced apart at the ends of said intermediate chamber in said tube.

26. The apparatus of claim 11 wherein said first and second membranes are formed of different permeable materials, and said first membrane is supported by a reinforcing mesh.

27. The apparatus of claim 11 wherein said first membrane is more permeable than said second membrane, and said first membrane has a thickness enabling stabilization of flow through the first membrane.

28. The apparatus of claim 27 wherein said second membrane is an unsupported pliable membrane.

29. The apparatus of claim 11 wherein said closed storage chamber is connected with a supply line which continuously inputs said stored chemical supply into said storage chamber.

30. The apparatus of claim 29 wherein said supply line connects serially with a pressure regulator.

31. The apparatus of claim 29 wherein said supply tube is serially connected to a carrier gas line flowing a carrier gas flow to pick up the flow of permeate from said second membrane.

32. The apparatus of claim 31 wherein said carrier gas flow is directed past the output side of said second membrane.

33. The apparatus of claim 31 including a regulator connected to said supply line to enable flow regulation prior to entry into said permeation tube.

34. The apparatus of claim 11 wherein said pressure control mechanism comprises:
(a) a port in said intermediate chamber; and
(b) a drain line attached to said port.

35. The apparatus of claim 11 wherein said pressure control mechanism comprises:
(a) a port in said intermediate chamber; and
(b) a flow tube with a crimp therein attached to said port.

36. The apparatus of claim 11 whereinsaid pressure control mechanism comprises a port opening into said intermediate chamber and a flow path from said intermediate chamber to the exterior to thereby permit permeated chemical supply to flow from said intermediate chamber out through said port and said intermediate chamber is maintained at a fixed pressure.

37. The apparatus of claim 11 wherein said intermediate chamber and said pressure control mechanism comprise an elongate hollow chamber having a port through the wall defining said chamber, and said port permits flow from said chamber, and said flow is from said chamber to the exterior.

* * * * *